United States Patent
Anderson

(10) Patent No.: US 9,396,111 B2
(45) Date of Patent: Jul. 19, 2016

(54) CACHING USING BASE SETUP VERSION

(71) Applicant: Microsoft Technology Licensing, LLC, Redmond, WA (US)

(72) Inventor: Jeffrey R. Anderson, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 14/152,689

(22) Filed: Jan. 10, 2014

(65) Prior Publication Data

US 2015/0199271 A1     Jul. 16, 2015

(51) Int. Cl.
*G06F 12/08* (2016.01)

(52) U.S. Cl.
CPC ........ *G06F 12/0802* (2013.01); *G06F 12/0808* (2013.01)

(58) Field of Classification Search
None
See application file for complete search history.

(56) References Cited

U.S. PATENT DOCUMENTS

| | | | | |
|---|---|---|---|---|
| 5,260,898 A | * | 11/1993 | Richardson | G07F 7/57 708/490 |
| 5,987,254 A | * | 11/1999 | Subrahmanyam | G06F 8/433 717/155 |
| 6,553,394 B1 | * | 4/2003 | Perry | G06F 17/10 708/200 |
| 7,546,420 B1 | | 6/2009 | Shar et al. | |
| 7,996,621 B2 | | 8/2011 | Brown et al. | |
| 8,510,750 B2 | | 8/2013 | Rodgers et al. | |
| 8,806,138 B1 | * | 8/2014 | Colby | G06F 12/0808 711/113 |
| 2003/0084251 A1 | | 5/2003 | Gaither et al. | |
| 2005/0149476 A1 | | 7/2005 | Griffin et al. | |
| 2008/0301378 A1 | | 12/2008 | Carrie | |
| 2011/0302371 A1 | * | 12/2011 | Lysko | G06F 1/0353 711/118 |
| 2012/0096448 A1 | * | 4/2012 | Doyle | G06F 8/4441 717/159 |
| 2015/0067261 A1 | * | 3/2015 | Keramidas | G06F 12/0875 711/125 |
| 2015/0074350 A1 | * | 3/2015 | Chiang | G06F 12/0808 711/118 |

* cited by examiner

*Primary Examiner* — Kaushikkumar Patel
(74) *Attorney, Agent, or Firm* — Thomas Marquis; Kate Drakos; Micky Minhas

(57) ABSTRACT

A consuming subsystem calculates information based on setup information from one or more other subsystems. Each of the one or more other subsystems generates a base version value that changes every time any of the setup information changes. The consuming subsystem caches information, including the base version values at the time the information was calculated by the consuming subsystem.

18 Claims, 6 Drawing Sheets

CACHING USING BASE SETUP VERSION

BACKGROUND

Caching is an often-used tool to aide in performance of algorithms and software. Any given value in cache also has a context in which that value is the correct value.

Relatively simple methods use patterns like memoization. In memoization, a function call is provided with remembered inputs. The function call returns the remembered result (that is remembered for those inputs) without re-calculating the result. In memoization, the context in which the cached value is correct is always the same for the given input parameters.

However, caching strategies such as memoization become problematic when additional information, outside of the calling method, is also needed to determine whether the cached information is correct. For example, a system may derive tax rate information, and cache that information. If any information (including the company's address or tax rate information or dozens of other things) change, then the cache needs to be invalidated.

Many current software systems handle this by explicitly invalidating all applicable caches at the point when the data changes. However, this approach forces the item being changed to know about all consumers who are caching that information, so that those caches can be invalidated. This can lead to unnecessary coupling between the items being changed and the consumers, and it can also lead to undesirable circular dependencies.

Another approach that has been used to handle such problems is by creating event subscriptions to changes. However, this means that any new types of changes that invalidate caching will require that the cache subscribe to them.

Yet another approach to this is to simply mass-invalidate all caches in the system when any change is made. However, this can be problematic because even very static data in a large system is likely changing fairly often. Therefore, a mass-invalidation on all changes can become extremely expensive.

These high costs of cache management in complex problems mean that many times developers do not employ caching even when it would be beneficial, because the cost of ensuring correctness of the cache is so high. Continuing on with the above-mentioned example of caching tax derivation information, there can be hundreds of aspects that go into tax derivation. Attempting to invalidate the cached results from changes to any of these aspects is very difficult. Therefore, even though tax setup information changes very infrequently, software systems often continually re-derive information that could have been cached just in case any of the information has changed.

The discussion above is merely provided for general background information and is not intended to be used as an aid in determining the scope of the claimed subject matter.

SUMMARY

A consuming subsystem calculates information based on setup information from one or more other subsystems. Each of the one or more other subsystems generates a base version value that indicates a version of the setup information. The consuming subsystem caches the calculated information, including the base version values at the time the information was calculated by the consuming subsystem, for later use.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
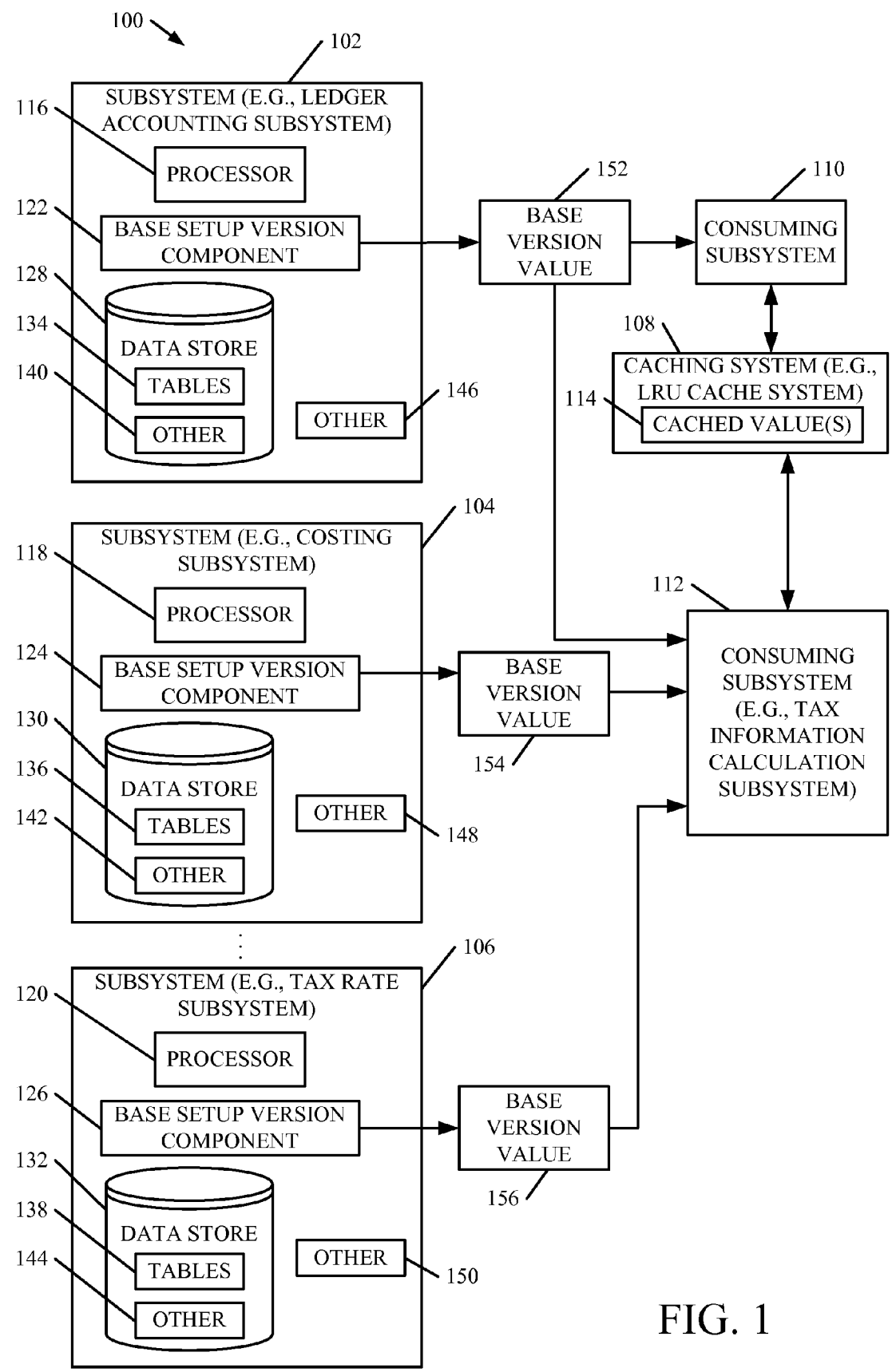
FIG. 1 shows one embodiment of a caching architecture.

FIG. 1 is a block diagram of one illustrative caching architecture 100. Architecture 100 illustratively includes a plurality of different subsystems 102, 104 and 106. While three subsystems are shown, architecture 100 could include only a single subsystem, or additional subsystems as well. The three subsystems shown in FIG. 1 are shown for the sake of example only.

Architecture 100 also illustratively includes a caching system 108 that is used by consuming subsystems 110 and 112 to cache information. Caching system 108 thus illustratively includes one or more cached values 114. It will also be noted that architecture 100 could include only a single consuming subsystem, or additional consuming subsystems. The two shown in FIG. 1 are shown for the sake of example only.

In one embodiment, consuming subsystems 110 and 112 compute values or information that depends upon the current setup information (or other information) stored in any one or more of subsystems 102, 104 and 106. In the example shown in FIG. 1, consuming subsystem 110 illustratively generates or calculates values based upon information from subsystem 102. Consuming subsystem 112 calculates values or information based upon information from all three subsystems 102, 104 and 106.

Each of subsystems 102, 104 and 106 illustratively include a processor (116, 118 and 120, respectively), a base setup version component (122, 124 and 126, respectively) and a data store (128, 130 and 132, respectively). The data stores 128, 130 and 132, themselves, illustratively include tables (134, 136 and 138, respectively) and other information (140, 142 and 144, respectively). Each subsystem can also illustratively include other information (146, 148 and 150, respectively).

The base setup version components 122, 124 and 126 illustratively calculate and expose a corresponding base version value (152, 154 and 156, respectively). The base version values indicate a version of a set of values within the corresponding subsystem. Thus, the value of a base version value changes if any of the set of values within the corresponding subsystem changes. As one example, each time any information in subsystem 102 changes, base setup version component 122 increments the base version value 152 in a monotonically increasing way. Thus, any specific base version value 152 represents the current combination of setup values (the current version of setup values) in subsystem 102. The same is illustratively true of system 104 and 106 and their corresponding base version values 154 and 156. That is, each time any of the setup information in subsystem 104 changes, base setup version component 124 changes (such as monotonically increases) base version value 154. Similarly, any time any of the setup information in subsystem 106 changes, base setup version component 126 changes (such as monotonically increases) base version value 156.

As a specific example, assume that subsystem 102 is illustratively a ledger accounting subsystem. Assume also that subsystem 104 is a costing subsystem and subsystem 106 is a tax rate subsystem. Assume further that consuming subsystem 112 is a tax information calculation subsystem 112 that calculates tax information based on a cost accounting configuration and that returns ledger accounting information based upon the tax rate information it calculates. Any change in the tax rate setup in tax rate subsystem 106, the accounting setup in ledger accounting subsystem 102 or the costing setup in costing subsystem 104, could impact the results of the method implemented by consuming subsystem 112.

Therefore, ledger accounting subsystem 102 illustratively exposes base version value 152. Each of the tables 134 in the ledger accounting system 102 illustratively call base setup version component 122 each time any change is made to that table, to increment base version value 152. In one implementation, base setup version component 122 is thus an event handler that is subscribed in each of the tables 134 in subsystem 102. It will be appreciated that changes that affect the base setup version value may be to data structures other than tables. The changes can be made to any persistent storage structure or to object-based non-persistent storage structures as well. Tables are used as examples only. Also, in one embodiment, each of the base version values comprises a 64-bit integer, although other base version values can be used as well.

In addition, the tables 136 in costing subsystem 104 illustratively call base setup version component 124 each time they are changed. This causes base setup version component 124 to increase base version value 154 with each change. Also, the tables 138 in tax rate subsystem 106 call base setup version component 126 to increase base version value 156 any time those tables are changed.

It can thus be seen that the three base version values 152, 154 and 156 represent the current state of setup information in subsystems 102, 104 and 106 and thus represent, to consuming subsystem 112, the current state of all of the setup information that it relies on in performing its tax information calculation. Consuming subsystem 112 can then perform a relatively simple memoization pattern using the input values of the method (when it is called) together with the three base version values 152, 154 and 156, with respect to caching system 108. Any cache lookup operation that identifies a value where the base versions match the cached base versions is known to still be accurate, because the setup information that consuming subsystem 112 relies on to perform its calculation, is all the same (i.e., the base version values 152, 154 and 156 have not changed since the value was previously calculated and cached by consuming subsystem 112).

Figure 2:
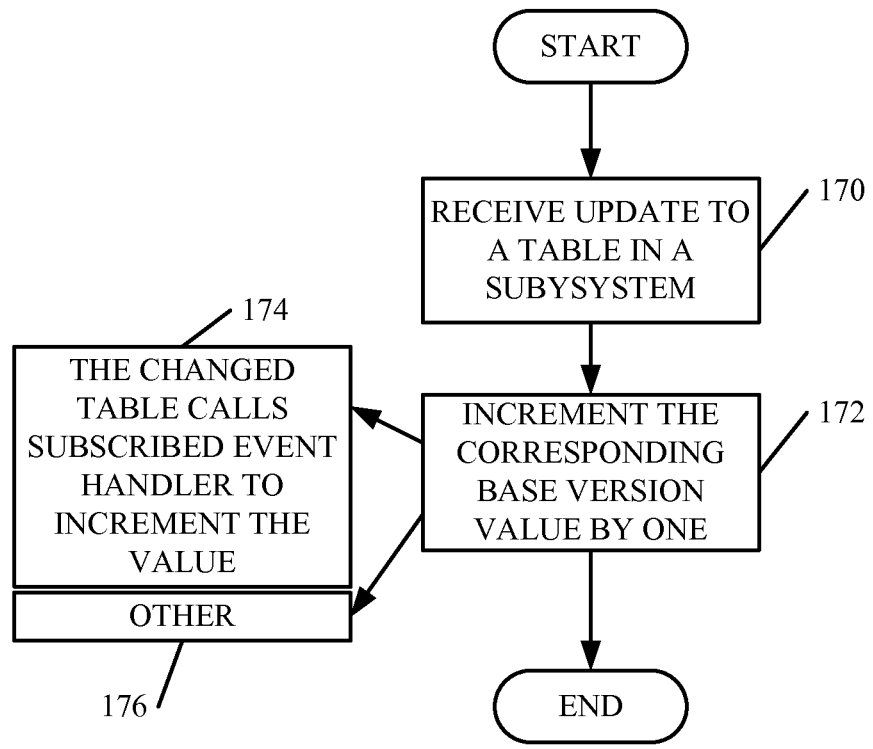
FIG. 2 is a flow diagram illustrating how a base version value is generated.

FIG. 2 is a flow diagram illustrating one embodiment of the operation of a base setup version component (122, 124 or 126) in generating the corresponding base version value 152, 154 or 156, respectively. The description will proceed with respect to the operation of base setup version component 122, although the same discussion applies to components 124 and 146 as well.

Subsystem 102 first receives an update to one of the tables 134 in subsystem 102. This is indicated by block 170 in FIG. 2. Base setup version component 122 then increments the corresponding base version value 152 by one. This is indicated by block 172. This can be done in a wide variety of different ways. In one embodiment, the changed table 134 calls base setup version component 122 as a subscribed event handler to have it increment the base version value 152. This is indicated by block 174. Of course, the base version value 152 can be changed in other ways as well, and this is indicated by block 176.

Figure 3:
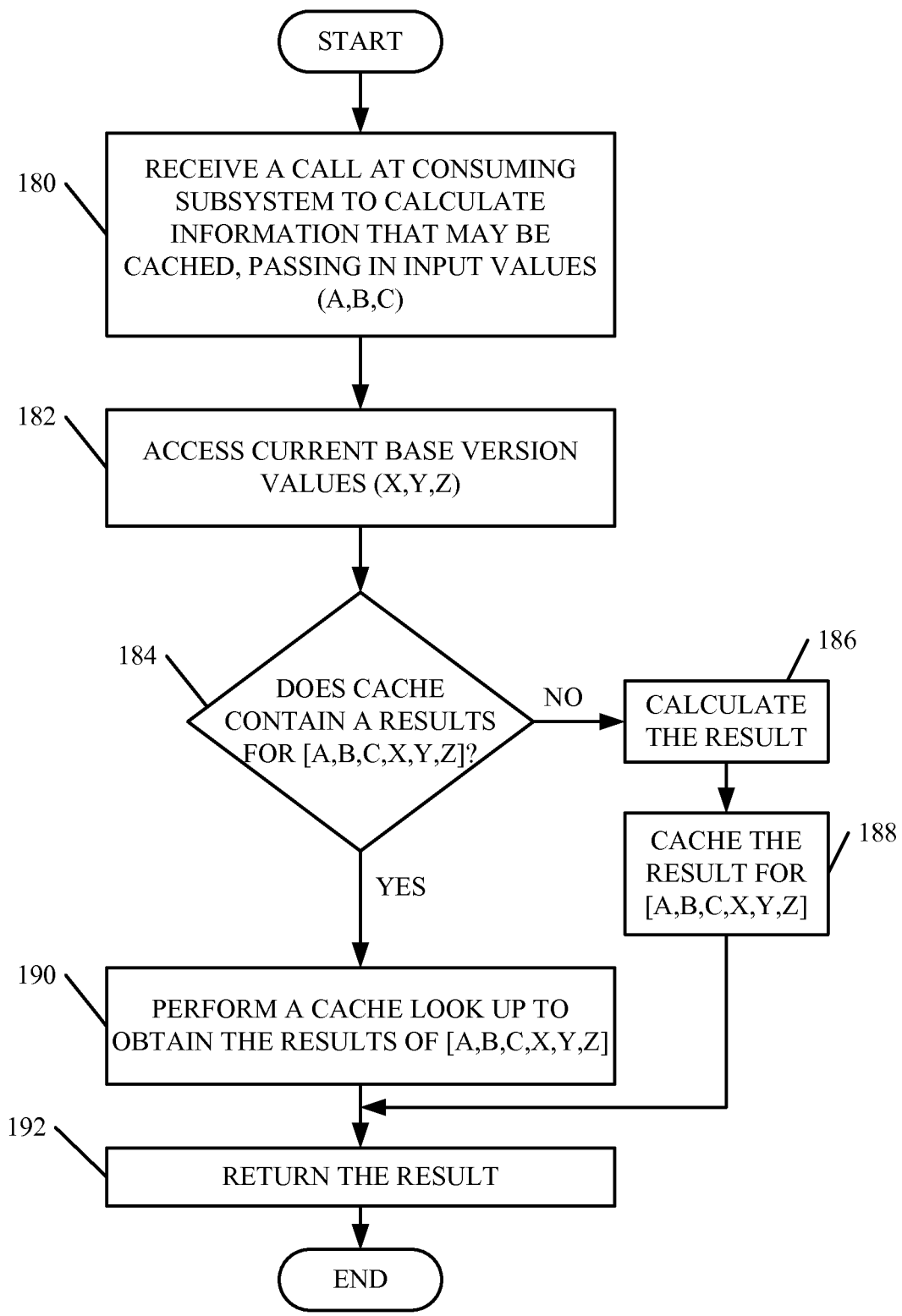
FIG. 3 is a flow diagram illustrating one embodiment of the operation of a consuming subsystem in the architecture shown in FIG. 1.

FIG. 3 is a flow diagram illustrating one embodiment of the operation of consuming subsystem 112 in determining whether a given cached value 114 is still valid, or whether it needs to be re-calculated and re-cached. Consuming subsystem 112 first receives a call to calculate the tax information. This is indicated by block 180 in FIG. 3. In receiving the call, consuming subsystem 112 also illustratively receives input values (such as values A, B and C) which it uses to calculate the tax information.

Consuming subsystem 112 then access the base version values 152, 154 and 156 (represented by the values X, Y and Z) in FIG. 3. This is indicated by block 182 in FIG. 3.

In order to determine whether it needs to re-calculate the tax information based on values A, B and C, consuming subsystem 112 first determines whether caching system 108 has a result for input values A, B and C, and for the corresponding base version values X, Y and Z. This is indicated by block 184 in FIG. 3. If not, that means that either consuming subsystem 112 has not calculated the tax information for this set of input values (A, B and C) or, the calculated tax information was based on different setup information, because one or more of the base version values (X, Y and Z) has changed. Thus, consuming subsystem 112 calculates the tax information result based upon input values A, B and C. This is indicated by block 186 in FIG. 3. Consuming subsystem 112 returns that value to the calling subsystem and also caches the calculated value for inputs A, B and C, along with the current base version values X, Y and Z. This is indicated by block 188 in FIG. 3. Thus, the next time a subsystem calls consuming subsystem 112 to obtain the tax information based upon values A, B and C, then assuming that the base version values X, Y and Z are still the same, consuming subsystem 112 can simply retrieve that value from caching system 108, instead of re-calculating it.

If, at block 184, it is assumed that consuming subsystem 112 has determined that caching system 108 does contain a result for input values A, B and C, and for base version values X, Y and Z, then consuming subsystem 112 simply asks caching system 108 to perform a cache lookup to obtain the result of the inputs A, B and C for base version values X, Y and Z. This is indicated by block 190 in FIG. 3. Whether the tax information result was re-calculated by consuming subsystem 112, or retrieved from caching system 108, it is then returned to the calling subsystem. This is indicated by block 192 in FIG. 3.

Figure 4:
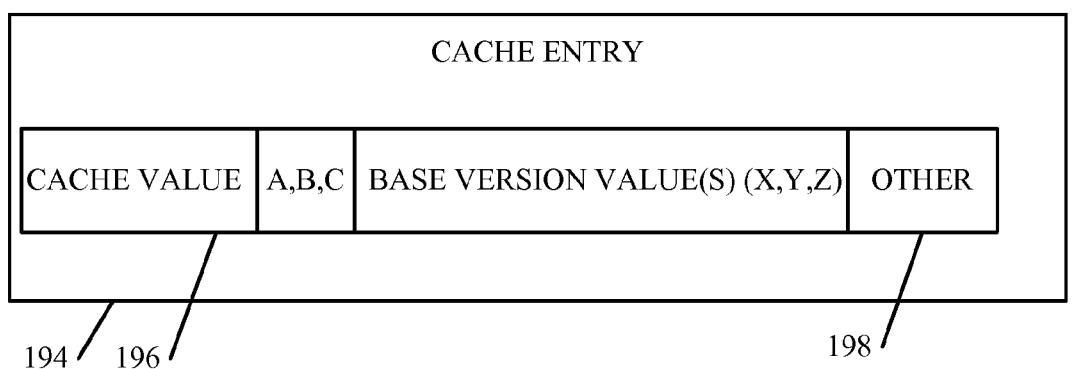
FIG. 4 is a block diagram of one illustrative cache entry.

It should be noted that the structure of the cached values 114 in caching system 108 can take a wide variety of different forms. FIG. 4 shows one illustrative block diagram of a cache entry 194. It can be seen that the cache entry includes the cache value 196 (which is the calculated value from consuming subsystem 112, based upon inputs A, B and C), it also includes the values A, B and C and the base version values (X, Y and Z), as they existed when cache value 196 was calculated. Of course, the cache entry can include other information 198 as well.

It should also be noted that, in one embodiment, caching system 108 employs a least recently used (LRU) caching technique. This means that the least recently used cached values 114 automatically fall out of cache under memory pressure (as more cache entries are added than the capacity of the memory in cache system 108). Thus, all cached values are kept up to date without performing any explicit cache invalidation. That is, as the tax information from consuming subsystem 112 needs to be re-calculated, they show up as a cache misses. When they are re-calculated and re-cached, an old value is dropped out of cache (when the capacity of the cache is exceeded). Also, it will be noted that, since the granularity of caching can be at a subsystem-by-subsystem level, an update in one subsystem does not invalidate all caches throughout the system. Instead, it only renders those caches that may be impacted by the update invalid (even though no explicit cache invalidation needs to be performed).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
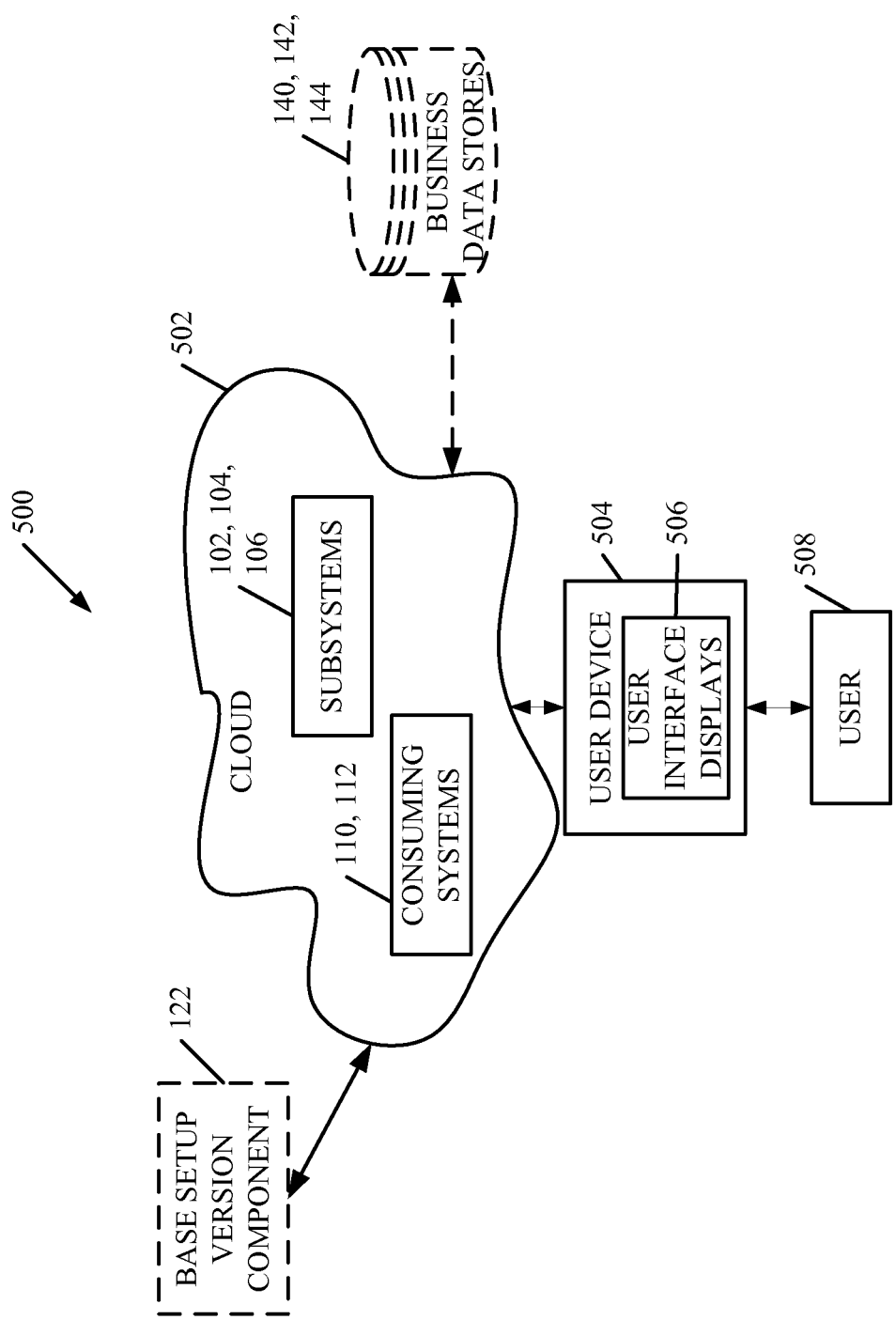
FIG. 5 shows the architecture of FIG. 1 deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that subsystems 102, 104, 106, 110 and 112 can be located in cloud 502 (which can be public, private, or a combination where portions are public while others are private). Therefore, user 508 uses a user device 504 and user interface displays 506 to access those systems through cloud 502.

FIG. 5 also depicts another embodiment of a cloud architecture. FIG. 5 shows that it is also contemplated that some elements of architecture can be disposed in cloud 502 while others are not. By way of example, data stores 140, 142 and 144 can be disposed outside of cloud 502, and accessed through cloud 502. In another embodiment, based setup version component 122 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
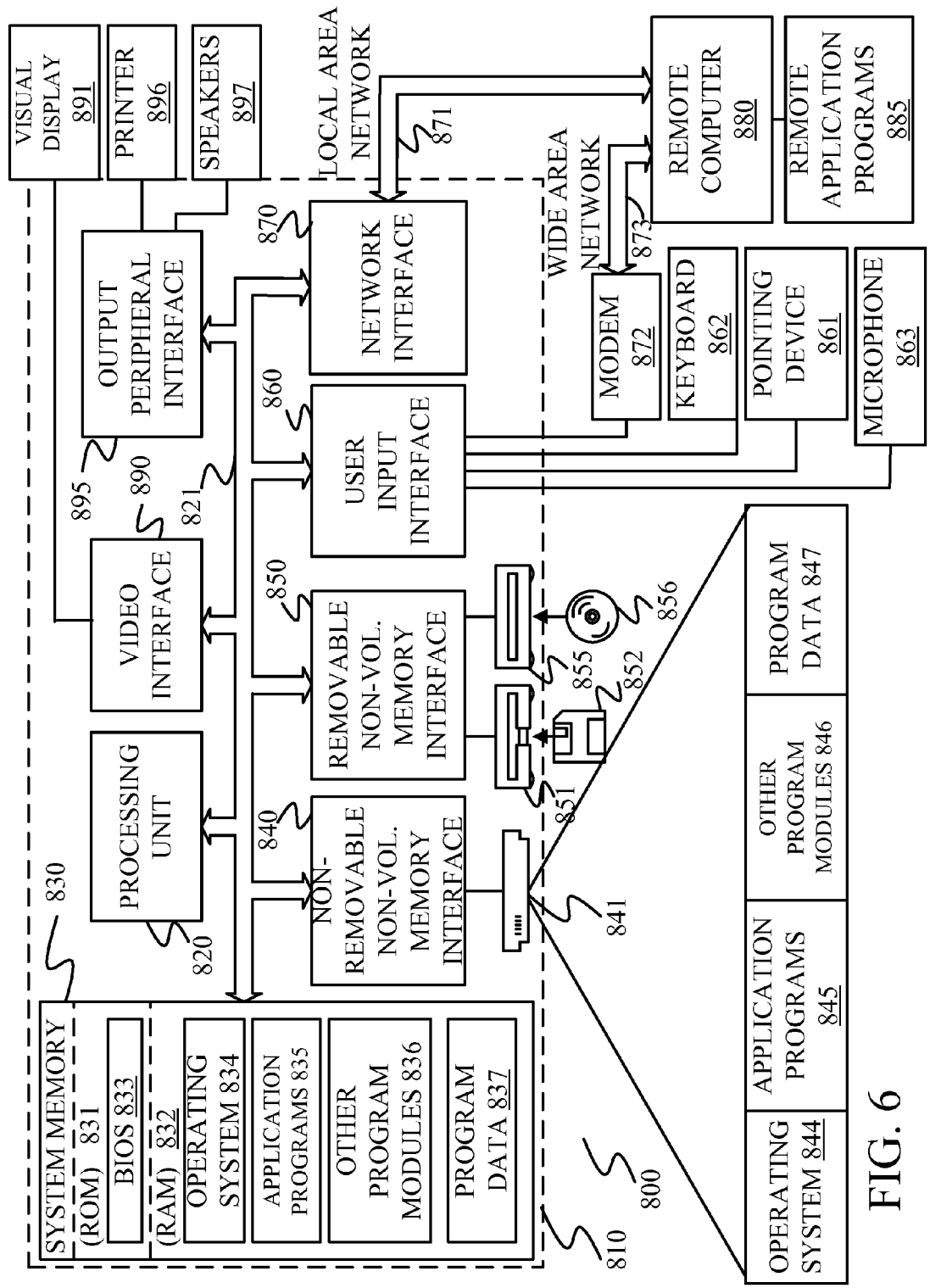
FIG. 6 shows one embodiment of a block diagram of a computing environment.

FIG. 6 is one embodiment of a computing environment in which architecture 100, or parts of it, (for example) can be deployed. With reference to FIG. 6, an exemplary system for implementing some embodiments includes a general-purpose computing device in the form of a computer 810. Components of computer 810 may include, but are not limited to, a processing unit 820 (which can comprise processor 122, 124 or 126 or processors in subsystems 110 and 112), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving a call to perform a calculation of a calculated value based on a plurality of input values from a first subsystem;
obtaining a current setup version value that is indicative of a current version of a plurality of setup values in the first subsystem; and
accessing a cache to determine whether the current setup version value has a same value as a setup version value for the first subsystem when a cached value was calculated and cached for the calculated value based on the current setup version value.

2. The computer-implemented method of claim 1 and further comprising:
generating the setup version value for the first subsystem based on changes to the plurality of setup values in the first subsystem.

3. The computer-implemented method of claim 2 wherein generating the setup version value for the first subsystem comprises:
changing the setup version value for the first subsystem each time a value of any of the plurality of setup values in the first subsystem is changed.

4. The computer-implemented method of claim 3 wherein changing the setup version value comprises:
monotonically increasing the setup version value for the first subsystem each time the value of any of the plurality of setup values in the first subsystem changes.

5. The computer-implemented method of claim 3 and further comprising:
if the cached value is valid for the calculated value, then obtaining the cached value from the cache; and
returning the cached value as the calculated value.

6. The computer-implemented method of claim 5 and further comprising:
if the cached value is invalid for the calculated value, then calculating the calculated value to obtain a newly calculated value;
caching the newly calculated value in the cache, along with the current setup version value; and
returning the newly calculated value as the calculated value.

7. The computer-implemented method of claim 6 wherein receiving a call to perform the calculation, comprises:
receiving the call with a set of input values used to perform the calculation.

8. The computer-implemented method of claim 7 wherein caching comprises:
caching the newly calculated value in a least recently used cache, for the set of input values.

9. The computer-implemented method of claim 1 wherein receiving a call to perform a calculation comprises receiving a call to perform the calculation of the calculated value based on a plurality of input values and based on the plurality of setup values from a first subsystem and a plurality of setup values from a second subsystem and further comprising:
obtaining a current setup version value that is indicative of a current version of the plurality of setup values in the second subsystem, and wherein accessing the cache comprises accessing the cache for the calculated value based on the current setup version values for the first and second subsystems and based on the plurality of input values received in the call.

10. A computer system, comprising:
a first subsystem that receives a value change to a stored value within the first subsystem;
a setup version component that generates a setup version value for the first subsystem indicative of a version of a plurality of stored values in the first subsystem;
a consuming system that generates and returns a requested value in response to a call, and that performs caching operations for the requested value based on the setup version value; and
a computer processor that is a functional part of the computer system and activated by the setup version component and the consuming system to facilitate generating the setup version value and performing caching operations.

11. The computer system of claim 10 wherein the setup version component changes the setup version value each time any of the stored values in the first subsystem changes.

12. The computer system of claim 11 wherein the consuming system returns a cached value for the requested value, from cache, if the setup version value for the first subsystem has a same value as when the cached value was cached.

13. The computer system of claim 12 wherein the consuming system calculates the requested value to obtain a newly calculated value, and caches the newly calculated value, along with the setup version value for the first subsystem, if the setup version value for the first subsystem has a different value from when the cached value was cached.

14. The computer system of claim 11 wherein the setup version component monotonically increases the setup version value for the first subsystem each time any of the stored values in the first subsystem changes.

15. The computer system of claim 14 and further comprising:
a plurality of additional subsystems, each with a corresponding setup version component that generates a setup version value for the corresponding subsystem that is indicative of a version of a plurality of stored values in the corresponding subsystem, wherein the consuming system generates and returns the requested value based on the plurality of stored values in each of the plurality of subsystems and performs caching operations for the requested value based on the setup version values for the first subsystem and each of the plurality of additional subsystems.

16. A computer readable storage medium that stores computer executable instructions which, when executed by a computer, cause the computer to perform a method, comprising:
receiving a call to perform a calculation of a calculated value based on a plurality of input values from a first subsystem;
obtaining a current setup version value that is indicative of a current version of a plurality of setup values in the first subsystem;
accessing a cache to identify a previously cached value of the calculated value;
determining whether the current setup version value has a same value as a setup version value for the first subsystem when the previously cached value was calculated and cached; and
if so, determining that the previously cached value is valid for the calculated value; and
if not, then determining that the previously cached value is invalid for the calculated value.

17. The computer readable medium of claim 16 and further comprising:

monotonically increasing the setup version value for the first subsystem each time the value of any of the plurality of setup values in the first subsystem changes.

18. The computer readable medium of claim 17 and further comprising:
- if the previously cached value is valid for the calculated value, then obtaining the previously cached value from the cache and returning the previously cached value as the calculated value; and
- if the previously cached value is invalid for the calculated value, then calculating the calculated value to obtain a newly calculated value, caching the newly calculated value in the cache, along with the current setup version value, and returning the newly calculated value as the calculated value.

* * * * *